(12) United States Patent
Fierstein et al.

(10) Patent No.: US 7,376,976 B2
(45) Date of Patent: May 20, 2008

(54) TRANSCRYPTION OF DIGITAL CONTENT BETWEEN CONTENT PROTECTION SYSTEMS

(75) Inventors: Scott J. Fierstein, Seattle, WA (US); Brian P. Evans, Redmond, WA (US); Geoffrey T. Dunbar, Kirkland, WA (US); James M. Alkove, Woodiville, WA (US); Daniel Rosenstein, Redmond, WA (US); Matthew Howard, Redmond, WA (US); Ming Ma, Bellevue, WA (US); Alexandre Vicktorovich Grigorovitch, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 90 days.

(21) Appl. No.: 11/276,496

(22) Filed: Mar. 2, 2006

(65) Prior Publication Data
US 2007/0185878 A1 Aug. 9, 2007

Related U.S. Application Data

(60) Provisional application No. 60/698,525, filed on Jul. 11, 2005.

(51) Int. Cl.
*G06F 7/04* (2006.01)
*G06F 17/30* (2006.01)
*H04N 7/167* (2006.01)
*H04K 1/00* (2006.01)
*G06F 21/00* (2006.01)
*G06F 1/00* (2006.01)
*G11B 20/00* (2006.01)

(52) U.S. Cl. .............................. 726/27; 726/2; 726/26; 380/242; 380/255

(58) Field of Classification Search ................. 726/27, 726/26, 2; 380/242, 255
See application file for complete search history.

(56) References Cited

U.S. PATENT DOCUMENTS
2003/0236978 A1* 12/2003 Evans et al. ................. 713/164

FOREIGN PATENT DOCUMENTS
EP 994475 A1 * 4/2000

OTHER PUBLICATIONS
Imad M. Abbadi, Chris J. Mitchell, "Digital Rights Management Using A Mobile Phone", Aug. 2007, ICEC '07 Proceedings of the ninth international conference on electronic commerce pp. 185-194.*

* cited by examiner

*Primary Examiner*—Matthew Smithers
*Assistant Examiner*—Courtney D Fields
(74) *Attorney, Agent, or Firm*—Microsoft Corporation

(57) ABSTRACT

Technology for protecting a digital content including a first content protection system capable of decrypting the digital content, the digital content including an inclusion list; a linkable library providing access for an application to the functionality of the first content protection system, the application including a second content protection system; and a means for evaluating the second content protection system to determine if the second content protection system is on the inclusion list.

20 Claims, 5 Drawing Sheets

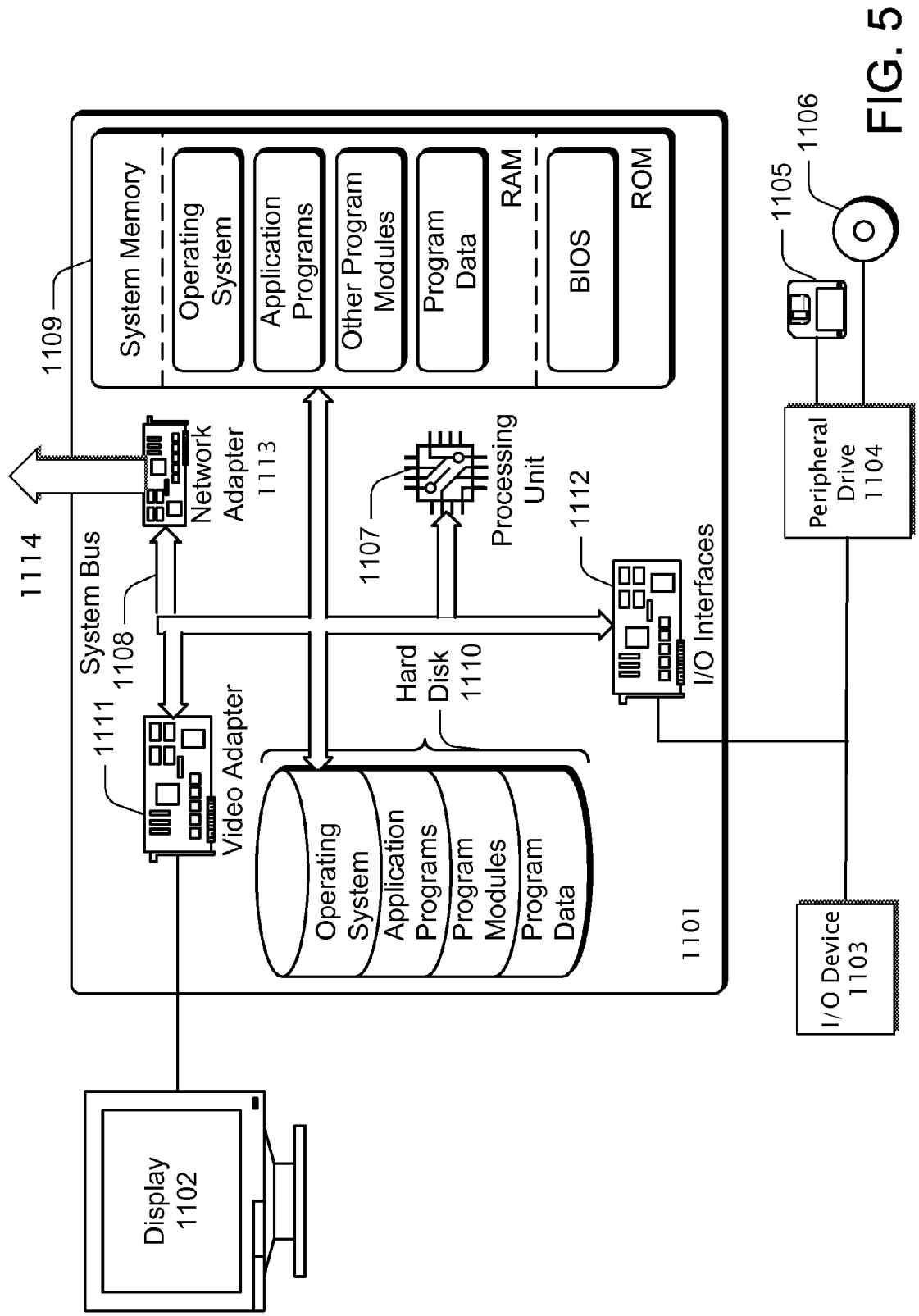

# TRANSCRYPTION OF DIGITAL CONTENT BETWEEN CONTENT PROTECTION SYSTEMS

CROSS-REFERENCE TO RELATED APPLICATION(S)

This application claims benefit to U.S. Provisional Patent Application No. 60/698,525, filed on Jul. 11, 2005.

TECHNICAL FIELD

This description relates generally to the protection of digital content and more specifically to transcryption of digital content between encryption formats used by different content protection systems and providing a transitory encryption for the digital content while it is being transferred between systems and/or software components.

BACKGROUND

This application relates generally to the use of digital content with consumer electronic devices and more specifically to the creation of compatibility and transcryption between various content protection mechanisms.

Electronic and computing systems may be designed to play or process digital content that is regulated. Such digital content may be controlled or owned by a third party that allows access to the content on a limited basis according to the protection mechanism being used. Examples of access control include allowing information to be accessed a pre-determined number of times, or for a given time period. A common way of controlling access to digital content is to encrypt the content such that it can only be accessed using a cryptographic key, and by including a license that specifies access rights to the content. Usage of the content must be consistent with the license in order for a system to access the digital content. Control of access is typically established at the time of content authoring or production by incorporating security features such as encryption and access rights that can limit unauthorized access to the information at a later time. But typically various content protection mechanisms do not allow a high degree of interoperability.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides technology for supporting transcryption of digital content between content protection systems and providing a transitory encryption for digital content while the content is being transferred between content protection systems and/or software components. The technology provides inclusion lists associated with a digital content to specify for which types of content protection systems the content may be transcrytped.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 5 illustrates an exemplary computing environment in which the systems and methods described in this application, may be implemented.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present invention is described and illustrated herein as being implemented in a consumer electronics ("CE") system, the system described is provided as an example and not a limitation. The present invention may be practiced with any device or system capable of supporting digital content. CE devices may include pocket PCs, set top boxes, portable media centers, cell phones, music players, PCs, software constructed media players, and the like. As those skilled in the art will appreciate, the present invention is suitable for application in a variety of different types of systems that provide digital content access and content protection. An example content protection system is a digital rights management ("DRM") system and is used in the description below. Other content protection systems may also be used to practice the present invention The examples may provide an explicit and robust means to authorize protected content to be transcrypted between content protection schemes. The examples may enable providers of digital content and content protection systems to authorize a downstream application to transcrypt individual pieces of content into an intermediate content protection format such as Rivest Cipher 4 ("RC4") when performing transcryption between a content protection format, such as Windows Media DRM ("WMDRM") for example, into another format such as Digital Transmission Content Protection ("DTCP"), or the like.

Figure 1:
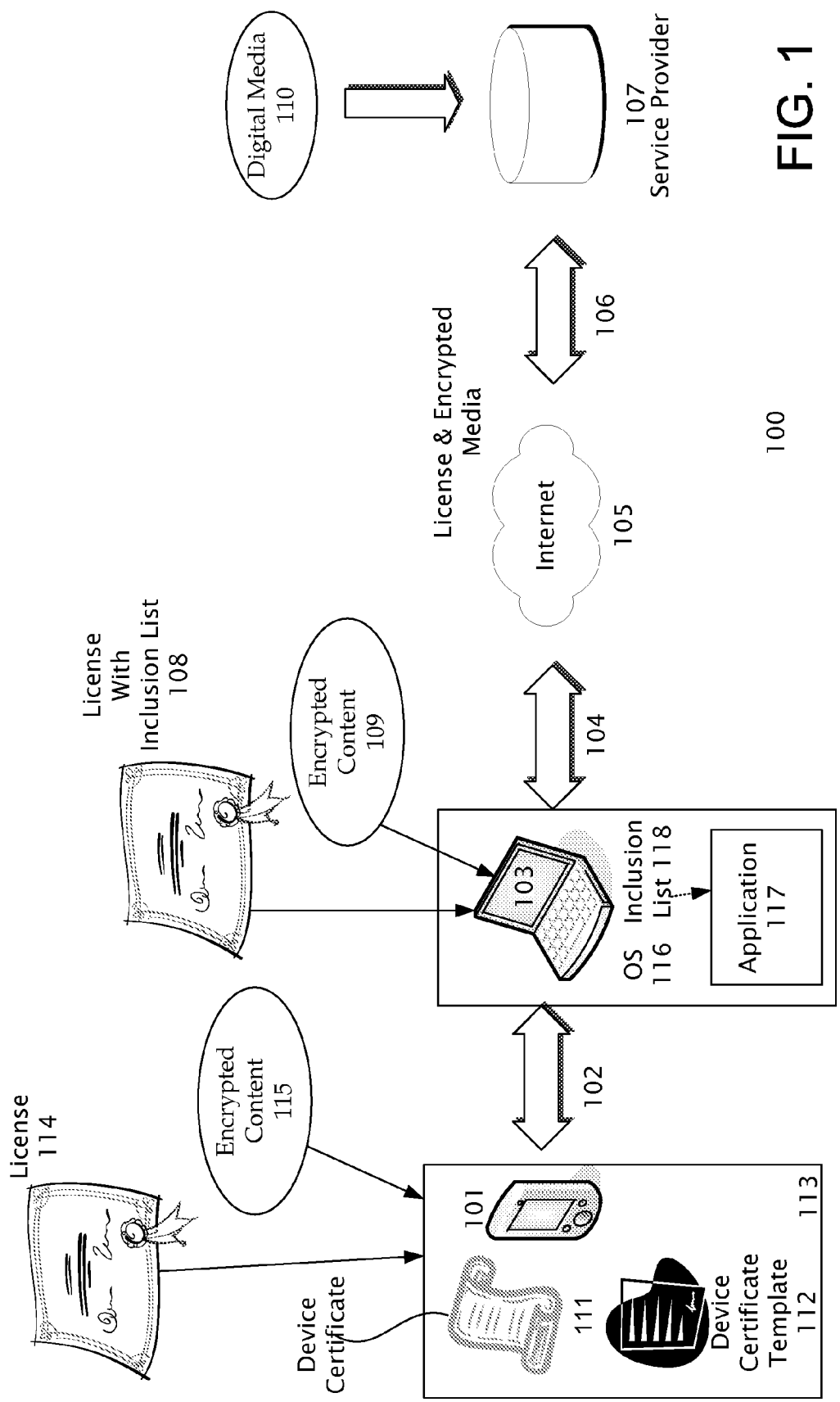
FIG. 1 is a diagram of an example content protection system having inclusion lists and allowing transcryption of digital content.

FIG. 1 is a diagram of an example content protection system having inclusion lists and allowing transcryption of digital content 100. Transcryption allows digital content that is compatible with a first content protection system, such as one DRM system, to be converted to a format that is compatible with a second content protection system, such as another DRM system. An inclusion list provides a way for a content owner to specify which conversions are permissible. Such a conversion is typically performed on a PC 103. DRM provides a system for defining, incorporating, and enforcing rights to digital content 110, such as multimedia content or other digital content or the like. A DRM system 100 provides for secure distribution of content 110 from a service provider 107 over insecure channels such as the Internet 105 or via CD, DVD, computer file or the like. The system 100 can enforce usage rules and protect the content 110 from being used illegally. Usage rules can include expiration dates, the number of times a user can play an audio or video file, and the number of times a user can copy an audio or video file and the like. An example of a Digital Rights Management system is provided in U.S. patent application Ser. No. 09/290,363, filed Apr. 12, 1999, and U.S. patent applications Ser. Nos. 10/185,527, 10/185,278, and 10/185,511, each filed on Jun. 28, 2002, which are all hereby incorporated by reference in their entirety.

A personal computer 103 may be used to connect to the internet 105 and transfer content from a service provider 107 to a consumer electronics device 101. The PC 103 may transcrypt encrypted content 109 that is compatible with a first DRM system, to an encrypted content 115 that is compatible with a second DRM system present, for example, on CE device 101. To transcrypt a media file 109, a license having an inclusion list 108 is transferred to the PC 103 along with the media file 109, typically from a service provider 107.

The access rights and restrictions for the content protection formats included in an Inclusion list are governed by the compliance rules that are typically set by a content owner, including which types of devices and/or content protection systems the accompanying media file 109 may be transcrypted to. In one example, the inclusion list may include global unique identifiers (GUIDs) that may be 16 byte numbers that uniquely identify permissible technologies that the encrypted content 109 may be transcrypted to. In another example, the inclusion list may include character strings, such as the string "Windows Media DRM", that uniquely identify the permissible protection technologies. Thus by providing a license having an inclusion list 108, increased operability between systems and devices may be provided.

The PC 103 typically functions using an operating system 116 operating in conjunction with an application program 117. The application program 117 typically performs the transcryption of the digital content 109 after inspecting the inclusion list 118 to determine if the target protection system is authorized for the digital content 109.

Protocols and mechanisms for transferring information to the PC 103, and to the CE device 101 over paths 102 and 104 may be conventional protocols and mechanisms such as Ethernet networks, universal serial bus ("USB"), infrared data association ("IrDA"), BlueTooth and the like. In alternative embodiments a consumer electronics device may be coupled to a service provider without using a personal computer 103. The personal computer and the CE devices may operate utilizing any number of suitable operating systems known to those skilled in the art. The instructions for implementing the functions described in this description may exist as computer-executable software, hardware (for example instructions burned into an ASIC), or a combination of both.

In use, DRM 100 protects contents 110 by providing encrypted content 109. Since content 109 is encrypted, the data itself is protected. Thus, the content 109 may be moved, archived, copied, or distributed without restriction. There is no need to hide encrypted content or make it inaccessible, or to put special protection in place when such digital content is transmitted from system to system. For example, copying such content and giving it to a friend will not enable that friend to use the content unless authorized. In order to be able to use encrypted content, users must obtain a license, and in this example a license having an inclusion list 108. This license with an inclusion list 108 is a means of protecting the encrypted content 110. In one example, a license may be granted to a single machine 101, and even if copied, it will not tend to function on other machines. However with an inclusion list the digital content may be provided to other machines operating with different protection schemes, as specified in the license inclusion list by a content owner, or the service provider 107. In another example, a license may be granted to a particular user account on a network such that the user can access the content from any device on the network when logged in via the authorized user account.

Each license with an inclusion list 108 contains access rights and restrictions, defining how the content may be used, and under what conditions. For example, a music file license may contain a "right to play" but not a "right to burn to CD" access right, and it might enable this right for the period between Oct. 1, 2005 and Nov. 1, 2005. It is also possible that there will be multiple licenses for a digital content selection. As long as one of those licenses grants the needed right, the user will be able to access and use the content data. Access may refer to cryptographically decrypting content, gaining access to content via password, or the like, so that the user can use, view, play or otherwise use the digital content. In an example embodiment the license with an inclusion list may be provided in XML format or the like.

As noted above, the inclusion list allows digital content to be provided to a variety of differing content protection systems. In one example, the DRM system operating on PC 103 uses the license with the inclusion list 108 in conjunction with the device certificate 111 obtained from CE device 101 to determine if the content can be transcrypted for use with the DRM system operating on device 101. Digital content for viewing or playback would typically include music files, picture files, video files, documents, and the like. A content protection system, such as that operating on CE device 101, identifies itself using a device certificate. In one example, a device certificate may be an Extensible Markup Language ("XML") data structure, or the like, which describes the system, lists supported features and access controls, and typically contains the system's public key. Device certificate 111 may be generated from a device certificate template 112 that is packaged 113 with the content protection system operating on consumer electronics device 101. The device certificate template may be considered a special pattern, guide or the like that aids in the creation of a device certificate.

Device certificate 111 is a validation mechanism that may be used by the DRM system of consumer electronics device 101 to help provide security by validating that a device's 101 DRM system is appropriate for accessing protected content 115. Device certificates are the credentials that may be trusted and relied upon by holders of protected digital content and that help initiate the process of providing access to the content. Such automated content protection validation may be used in systems 100 designed for secure playback or use of protected digital content and where digitally signed certificates 111, or the like, are used as the way of providing validation of rights to access digital content. Protected digital content 115 may include music, video, text, or any content that is subject to management by conventional license agreements or the like.

The example device certificate 111 may be an XML object includes device identification, device capabilities claims, vital information, public key information, and the like, and present such data in a single digitally-signed device certificate. The device certificate 111 may be signed by the DRM provider (not shown), which may act as a certification by the provider that the device certificate 111 is an accurate reflection of the DRM system accompanying it, and by a third party trusted authority (not shown), which certifies that the DRM provider is authorized to create and certify the accompanying DRM system. An example of device certificates and device certificate templates is provided in U.S. patent application Ser. No. 10/18,204, filed Oct. 18, 2004 which is hereby incorporated by reference in its entirety.

Figure 2:
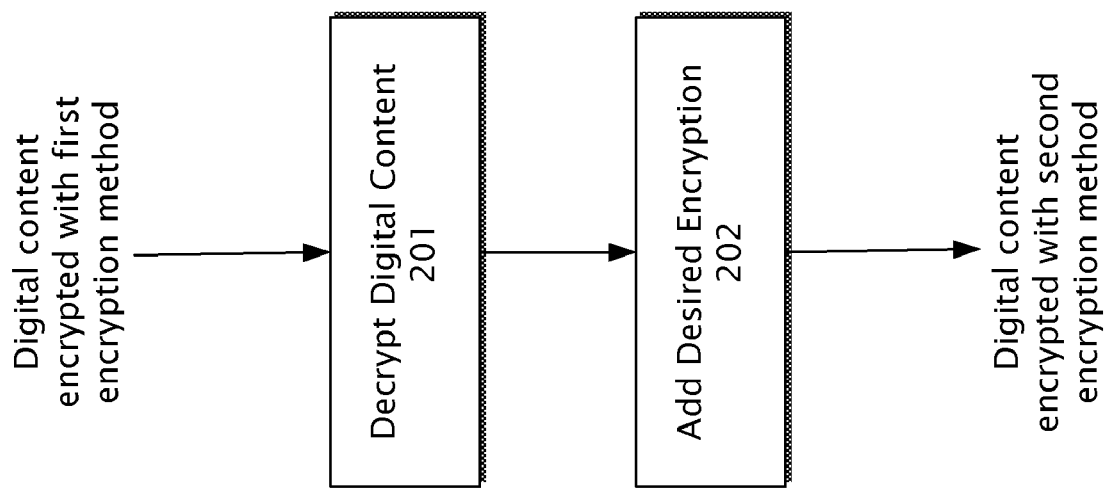
FIG. 2 is a flow diagram showing two main operations in the process of transcrypting or changing the encryption of digital content.

FIG. 2 is a flow diagram showing two main operations in the process of transcrypting or changing the encryption of digital content. An approach to providing transcryption is to provide initially encrypted digital content, remove the encryption 201 on the content (for instance, the encryption that WMDRM applies to protected content), then add a new encryption 202 to the content (for instance, RC4 encryption).

Figure 3:
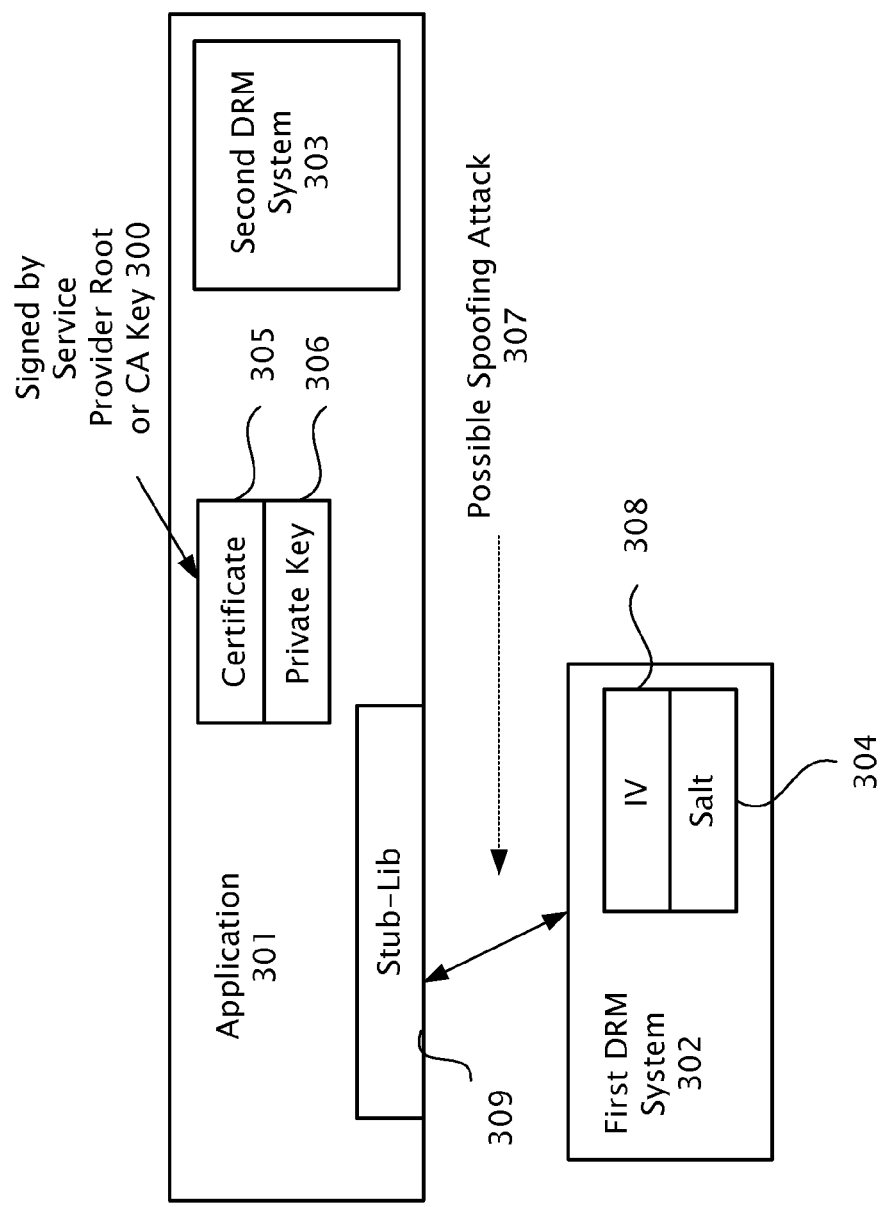
FIG. 3 is a block diagram showing data being securely passed through an application in a transcryption process.

FIG. 3 is a block diagram showing data being securely passed through an application 301 in a transcryption process. A content provider may regulate content and limit its exposure by providing an inclusion list. An inclusion list may be provided to allow transcryption from a first DRM system to a second DRM system. In an example of a content protection system transcryption may be provided for digital content having an inclusion list, and in an alternative example of a content protection system transcryption may be provided for digital content not having an inclusion list.

First DRM system 302 includes a linkable library 308 that can be linked into an application such as application 301. Library 309 provides application 301 access to the first DRM system 302. In one example library 309 may be provided as a ".lib" file or the like. In another example the library may be provided as a ".dll" (dynamic link library) file or the like. Library 309 may take other forms as well to provide application 301 with access to the functionality of first DRM system 302.

A certificate 305 is included with the application 301, that is signed by the provider's root or certificate authority key 300. In one example, private key 306, typically including, for example, an RSA private key, is provided along with the certificate 305, typically when the system is authored or installed.

At run time the certificate 305, is passed to the first DRM system 302, typically in response to a request to access digital content held by the first DRM system 302. The first DRM system 302 generates a random number or initialization vector ("IV") 308. The IV 308 is provided to the application 301, typically in a secure fashion, and stored. In one example, the IV 308 is passed between systems using a secure channel. In another example, the IV 308 is encrypted using a key, such as the public key from certificate 305, before it is provided to the application 301. The IV 308 is decrypted with the private key of the application and stored.

At this point the digital content is typically decrypted by the first DRM system 302 in small chunks or samples. As the original encryption of the digital content is removed, the first DRM system 302 applies a new encryption to the chunks for protection as they are provided to the application 301. The process of decrypting data and re-encrypting the chunks before they are sent to application 301 is a form of transcryption typically referred to as transitory encryption, and may tend to minimize susceptibility to man in the middle attacks 307 or the like.

Each digital content sample or chunk is generally encrypted using a transitory encryption key that tends to be unique for each content sample. In one example, this transitory encryption key is formed by generating a unique salt value 304 for each digital content sample or chunk, and then hashing this unique salt value 304 with the IV value 308 The chunk is encrypted using the transitory encryption key and is provided, along with the salt value 304, to the application 301. Once a content chunk arrives at application 301, the application 301 creates a transitory encryption key from the stored IV 308 and the salt value 304 and removes the transitory encryption from the content chunk. At this point application 301 can apply the appropriate protection, typically including encryption, required by the second DRM system 303. After the digital content sample or chunk has been protected by the second DRM it can be utilized in anyway that is permitted by the system 303, for example by playing it if it was from a digital audio file.

Figure 4:
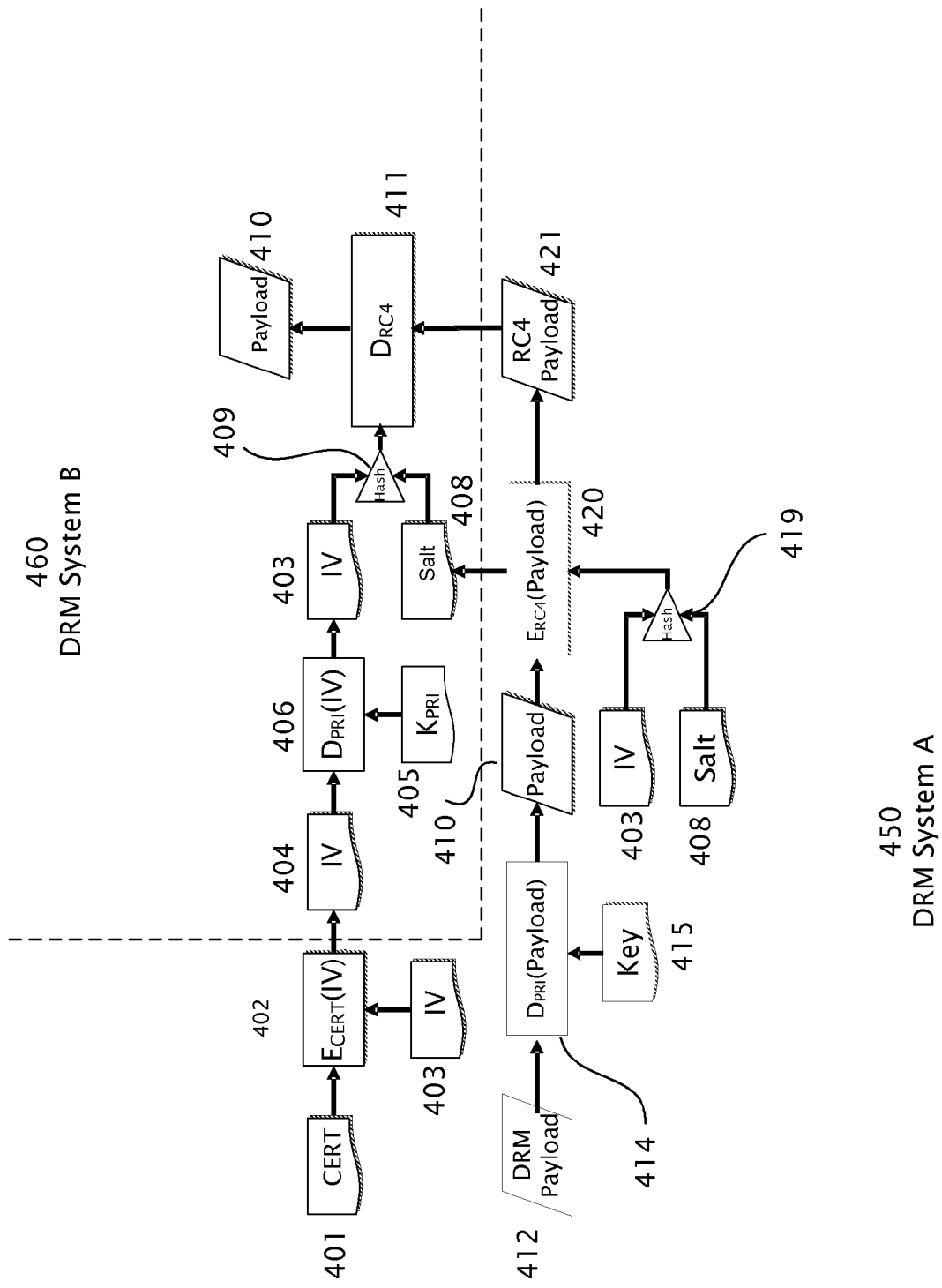
FIG. 4 is a block diagram showing an example detailed process for protecting digital content using a transcryption process.

FIG. 4 is a block diagram showing an example detailed process for protecting digital content using a transcryption process. An example of digital content (also called DRM Payload) 412 is digital video data such as might be provided as a movie. Such digital content is typically encrypted by the content provider of the content, as indicated in FIG. 4. Other examples of digital content include digital audio data, digital images, or other multi-media or digital content including documents or the like. In addition to encryption, such digital content typically include some form of access rights information. In one example these access rights include an inclusion list indicating what other types of content protection mechanisms can be trusted and utilized to access and/or transcript the digital content.

FIG. 4 shows an example DRM system A 450 that includes several elements and steps for processing digital content 412 for transcryption by DRM system B 460. Example DRM system B includes several elements and steps that may be distributed between applications, DRM systems or the like. In one example, DRM system B includes and application with a DRM system. DRM system A 450 and DRM system B 460 interact to remove the encryption provided by the content provider, re-encrypt the content with and transitory encryption understood by both DRM systems, securely transfer the transitory encrypted content to DRM system B 460 where the content is decrypted and then finally re-encrypted in whatever format is used by DRM system B 460.

At the beginning of an example transcryption process, system B initiates a transcryption process. One example of such an initiation is an attempt to play a digital movie file. Typically a certificate or the like is sent from system B to system A 450. System A inspects the certificate to determine is system B can be trusted and if system B is listed in the inclusion list of the digital content. If system B can be trusted and is on the inclusion list, then system A will continue with the transcryption process. Otherwise the process will not continue as system B either may not be trusted or is not listed on the digital content's inclusion list.

On continuation, system A obtains a cryptographic key 401 from system B. In one example, the cryptographic key is a public key and is obtained from the certificate obtained from system B. System A generates an initialization vector ("IV") 403 and encrypts 402 IV 403 using public key 401 resulting in an encrypted IV 404. In one example, IV 403 is a random number suitable for use in hashing and generating another cryptographic key.

System A provides encrypted IV 404 to system B, typically using a secure channel. System B decrypts 406 encrypted IV 404 using private key 405 resulting in the original IV value 403. System B stores IV 403 in a secure fashion, such as using obfuscation or the like, for later use. At this point the initialization between system A and system B is complete and transitory transcryption can begin.

System A now begins to read and decrypt 414 digital content 412. In one example, system A decrypts 414 digital content 412 using a key 415. In one example, the key 415 is accessed by decrypting it using a private key that corresponds to a public key used by the content provider to originally encrypt the key 415 for the digital content 412. In another example, system A decrypts 414 digital content 412 in small chunks, typically several tens, hundreds, or thousands of bytes per chunk. In another example, system A decrypts 414 all of digital content 412 before continuing. Each chunk decrypted 414 results in unencrypted digital content (also known as payload) 410.

Next, system A generates salt 408. In one example, salt 408 is a random number generated per digital content chunk 410 that is suitable for use in hashing and generating another cryptographic key. In one example, such a cryptographic key may be an RC4 key. System A hashes 419 salt value 408 and IV 403 resulting in a cryptographic key. In another example, hash 419 may be a secure hash algorithm ("SHA") hash. Next, system A encrypts 420 content chunk 410 using the RC4 key generated via the hash 419 of IV 403 and salt 408 corresponding to the content chunk being encrypted, resulting in transitory encrypted content chunk 421. In one example, an RC4 stream cipher is used for encryption 420 resulting in an RC4 encrypted content chunk (also known as RC4 payload) 421.

System A provides salt 408 and corresponding transitory encrypted content chunk 421 to system B, typically using a secure channel. System B then hashes 409 previously stored IV 403 and just received salt 408 to generate an transitory decryption key and decrypts 411 just received transitory encrypted content chunk 421 resulting in unencrypted digital content 410. In one example, decryption 411 and unencrypted content chunk 410 are performed and maintained within system B in a secure manner, such as using code and/or data obfuscation. In another example, hash 409 may be a secure hash algorithm ("SHA") hash.

System B may now continue to transcrypt content chunk 410 as dictated by the overall transcryption process. In one example, as in the case of audio data, content chunk 410 is further encrypted and provided to a codec for rendering via a media player application or the like. The above process continues for each chunk of digital content 410, typically until the entire digital content 412 has been transcrypted.

FIG. 5 illustrates an exemplary computing environment 500 in which the systems and methods described in this application, may be implemented. Exemplary computing environment 500 is only one example of a computing system and is not intended to limit the examples described in this application to this particular computing environment.

The computing environment 500 can be implemented with numerous other general purpose or special purpose computing system configurations. Examples of well known computing systems, may include, but are not limited to, personal computers, hand-held or laptop devices, microprocessor-based systems, multiprocessor systems, set top boxes, programmable consumer electronics, gaming consoles, Consumer electronics, cellular telephones, PDAs, and the like.

The computer 500 includes a general-purpose computing system in the form of a computing device 501. The components of computing device 501 can include one or more processors (including CPUs, GPUs, microprocessors and the like) 507, a system memory 509, and a system bus 508 that couples the various system components. Processor 507 processes various computer executable instructions to control the operation of computing device 501 and to communicate with other electronic and computing devices (not shown). The system bus 508 represents any number of several types of bus structures, including a memory bus or memory controller, a peripheral bus, an accelerated graphics port, and a processor or local bus using any of a variety of bus architectures.

The system memory 509 includes computer-readable media in the form of volatile memory, such as random access memory (RAM), and/or non-volatile memory, such as read only memory (ROM). A basic input/output system (BIOS) is stored in ROM. RAM typically contains data and/or program modules that are immediately accessible to and/or presently operated on by one or more of the processors 507.

Mass storage devices 504 may be coupled to the computing device 501 or incorporated into the computing device by coupling to the buss. Such mass storage devices 504 may include a magnetic disk drive which reads from and writes to a removable, non volatile magnetic disk (e.g., a "floppy disk") 505, or an optical disk drive that reads from and/or writes to a removable, non-volatile optical disk such as a CD ROM or the like 506. Computer readable media 505, 506 typically embody computer readable instructions, data structures, program modules and the like supplied on floppy disks, CDs, portable memory sticks and the like.

Any number of program modules can be stored on the hard disk 510, Mass storage device 504, ROM and/or RAM 509, including by way of example, an operating system, one or more application programs, other program modules, and program data. Each of such operating system, application programs, other program modules and program data (or some combination thereof) may include an embodiment of the systems and methods described herein.

A display device 502 can be connected to the system bus 508 via an interface, such as a video adapter 511. A user can interface with computing device 702 via any number of different input devices 503 such as a keyboard, pointing device, joystick, game pad, serial port, and/or the like. These and other input devices are connected to the processors 507 via input/output interfaces 512 that are coupled to the system bus 508, but may be connected by other interface and bus structures, such as a parallel port, game port, and/or a universal serial bus (USB).

Computing device 500 can operate in a networked environment using connections to one or more remote computers through one or more local area networks (LANs), wide area networks (WANs) and the like. The computing device 501 is connected to a network 514 via a network adapter 513 or alternatively by a modem, DSL, ISDN interface or the like.

Those skilled in the art will realize that storage devices utilized to store program instructions can be distributed across a network. For example a remote computer may store a tool such as the adaptive instrumentation runtime monitoring and analysis software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A computing system for protecting a digital content, the system comprising:
    a first content protection system capable of decrypting the digital content, the digital content including an inclusion list that enumerates a plurality of content protection systems with which the digital content maybe used;
    a linkable library providing access for an application to the functionality of the first content protection system, the application including a second content protection system; and
    a means for evaluating the second content protection system to determine if the second content protection system is enumerated in the inclusion list.

2. The system of claim 1 further comprising a means for securely coupling the content protection system and the linkable library.

3. The system of claim 1 further comprising a means for calculating an initialization vector, the initialization vector being shared between the first content protection system and the second content protection system via a sharing means.

4. The system of claim 3 further comprising a means for calculating a salt value based on a chunk of the digital content, the salt value being combined with the initialization vector via a cryptographic hashing means resulting in a transitory encryption key.

5. The system of claim 4 further comprising a means for producing a transitory encryption of the chunk using the transitory encryption key.

6. The system of claim 5 further comprising a means for providing the transitory encryption of the chunk, the initialization vector, and the salt value to the second content protection system.

7. A method for transcrypting a digital content, the method comprising:
    decrypting the digital content via a first content protection system, the decrypting resulting in a decrypted digital content;
    producing a transitory encryption key and a transitory encryption of the decrypted digital content using the transitory encryption key; and
    providing the transitory encryption key and the transitory encryption to a second content protection system.

8. The method of claim 7 further comprising checking an inclusion list for the digital content to determine if the digital content can be transcrypted to the second content protection system.

9. The method of claim 7 wherein the transitory encryption key is produced by cryptographically hashing an initialization vector and a salt value, the salt value calculated based on a chunk of the digital content.

10. A method of protecting a digital content, the method comprising a first content protection system:
    generating an initialization vector;
    decrypting a chunk of the digital content;
    generating a salt value based on the chunk;
    cryptographically hashing the initialization vector and the salt value resulting in a transitory key; and
    producing a transitory encryption of the chunk by encrypting the chunk using the transitory key.

11. The method of claim 10 wherein the digital content includes and inclusion list that enumerates a plurality of content protection systems with which the digital content maybe used.

12. The method of claim 10 wherein the initialization vector is a random number.

13. The method of claim 10 wherein the salt value is a number calculated using the chunk.

14. The method of claim 10 wherein the transitory encryption is produced using a stream cipher.

15. The method of claim 10 further comprising a second content protection system:
    receiving an encrypted initialization vector from the first content protection system;
    decrypting and storing the initialization vector;
    receiving the transitory encryption from the first content protection system;
    receiving the salt value from the first content protection system;
    cryptographically hashing the initialization vector and the salt value resulting in a duplicate of the transitory key; and
    decrypting the transitory encryption using the duplicate of the transitory key.

16. The method of claim 15 wherein the second content protection system is listed on the inclusion list.

17. The method of claim 15 wherein the initialization vector is encrypted by the first content protection system using a public key provided by the second content protection system.

18. The method of claim 15 wherein the encrypted initialization vector is decrypted by the second content protection system using a private key provided by the second content protection system.

19. The method of claim 15 wherein the initialization vector is stored in a secure manner.

20. The method of claim 15 wherein the method is embodied in a computer-readable medium.

* * * * *